United States Patent [19]

Tirone

[11] Patent Number: 5,049,928
[45] Date of Patent: Sep. 17, 1991

[54] SPOOLED PHOTOSENSITIVE WEB CARTRIDGE

[75] Inventor: George F. Tirone, Miamisburg, Ohio

[73] Assignee: The Mead Corporation, Dayton, Ohio

[21] Appl. No.: 541,666

[22] Filed: Jun. 21, 1990

[51] Int. Cl.$^5$ .............................................. G03B 27/58
[52] U.S. Cl. ...................................... 355/72; 354/275; 242/71; 242/71.1; 206/414
[58] Field of Search .......................... 355/72; 354/275; 242/71, 71.1; 206/414

[56] References Cited

U.S. PATENT DOCUMENTS

| 4,733,777 | 3/1988 | Van Geyte et al. | 206/414 |
| 4,861,695 | 8/1989 | Higashiyama | 430/138 |
| 4,864,362 | 9/1989 | Hayashi | 355/72 |

FOREIGN PATENT DOCUMENTS 298346 12/1988 Japan .
63-962 3/1989 Japan .

Primary Examiner—Monroe H. Hayes
Attorney, Agent, or Firm—Thomas A. Boshinski

[57] ABSTRACT

A spooled photosensitive web cartridge and a spooled photosensitive web cassette are disclosed.

The web cartridge includes a cylindrical core, a pair of end caps, a length of photosensitive material, and a leader sheet. The end caps are disposed coaxially on the core at an axial distance between each other. The photosensitive material is wound onto the core to form a cylindrical web between the end caps. The leader sheet is secured to the leading end of the photosensitive material, and includes an opaque wider portion circumferentially disposed entirely around the web to form a tubular enclosure. The wider portion of the leader sheet has a width greater than the axial distance between the end caps. The opposite side edges of the wider portion are detachably connected respectively to the end caps so as to mechanically retain the tubular enclosure on the end caps as well as to provide a light-tight seal between the tubular enclosure and the end caps.

The web cassette utilizes the web cartridge and further includes a take-up spool and a cassette frame. Both the web cartridge and the take-up spool are held by the frame for rotational movement about their respective axes.

45 Claims, 9 Drawing Sheets

SPOOLED PHOTOSENSITIVE WEB CARTRIDGE

BACKGROUND OF THE INVENTION

The present invention relates to a cartridge and a cassette of a spooled photosensitive material such as a sheet or film having a layer of a chemical composition sensitive to actinic radiation. More particularly, the present invention relates to a cartridge and a cassette of a spooled photosensitive material, which are designed to be loaded in imaging devices such as printers, copiers and cameras. Either of the cartridge and the cassette includes a spooled photosensitive material and a leader sheet secured to the leading end of the spooled photosensitive material. The leader is disposed around the web of the photosensitive material to form a tubular enclosure which is light-tightly connected to and mechanically held by the spool.

Japanese Patent Kokai Publication No. 63-298346 discloses a spooled photosensitive microcapsule medium enclosed light-tightly in a container-type cassette case. The cassette case rotatably holds both a feed spool and a take-up spool. The photosensitive medium spooled on the feed spool is exposed to light, and thereafter, is wound onto the take-up spool. The cassette case has an inlet and an outlet through which the medium is drawn out of and taken into the cassette case, respectively.

Cartridges of spooled microcapsule media are also known in the art. Japanese Patent Kokai 64-63962 discloses a cartridge of a rolled microcapsule medium received in a light-tight container. The medium is taken out of the case through an outlet in a similar manner as it is in the aforementioned publication.

U.S. Pat. No. 4,861,695 discloses a cartridge which encases a light-sensitive microcapsule recording medium. The cartridge is composed of a water-soluble material and has a light-shielding property. This cartridge is also of a container type and thus has an outlet for the medium.

One of the drawbacks of any of the above-mentioned container-types of cassette or cartridge is that since the outlet for the medium is designed to be very narrow to maintain the light tightness, the medium is rubbed against the cassette or cartridge when drawn out of the container. This can result in damage to the photosensitive medium such as accidental rupture of the microcapsules.

U.S. Pat. No. 4,864,362 discloses a container-type cartridge which avoids the above-mentioned problem by employing an operable lid for opening and closing the outlet. However, a container-type case is still costly as a disposable cassette or cartridge case, and necessitates in imaging devices a relatively large space which can accommodate the bulky container-type case.

SUMMARY OF THE INVENTION

Accordingly, an object of the present invention is to provide a spooled photosensitive web cartridge and a cassette, which do not employ a container for the spooled web and still maintain a light-tight seal as well as mechanical protection for the photosensitive sheet material.

Another object of the present invention is to provide a spooled photosensitive web cartridge and a cassette, which are of a simple, compact and economical structure.

Still another object of the present invention is to provide a spooled photosensitive web cartridge and a cassette, which do not damage the photosensitive material upon spooling-off of the photosensitive material.

In view of the above and other objects, the present invention provides a spooled photosensitive web cartridge which utilizes a leader sheet to form a tubular enclosure for a spooled photosensitive web. The formed tubular enclosure is light-tightly connected with and mechanically supported by the spool, resulting in a non-container-type cartridge of a simple structure. Alternatively, the present invention provides a spooled photosensitive web cassette in which the non-container-type cartridge and a take-up spool are held on a frame for rotational movement about their respective axes.

In accordance with one embodiment of the present invention, a leader sheet attached to the leading end of a spooled web of photosensitive material includes an opaque wider portion of which the width is greater than the distance between a pair of end caps of the spool. The wider portion of the leader sheet is wrapped more than one time around the web of photosensitive material with its opposite side edges inserted into a pair of annular grooves formed in the end caps, respectively. As a result, the wrapped leader sheet provides a tubular enclosure for light-tightly sealing and mechanically protecting the photosensitive material. The wider portion of the leader sheet may be provided with perforations whereas the end caps may be provided in the annular grooves with projections for engagement with the perforations. The perforated side edges of the wider portion engaging with the projections on the end caps increase the mechanical strength of the tubular enclosure. To further increase the mechanical strength of the tubular enclosure, the wider portion of the leader sheet may have a plurality of ridges extending between its opposite side edges. Disposing the wider portion at a radial distance from the web of photosensitive material assures that the web is protected from external force such as diametrical crushing force likely to be applied during handling of the cassette or cartridge.

According to another embodiment of the present invention, the wider portion of the leader sheet is fixed at the opposite side edges thereof to the end caps while the leader sheet is provided with tear lines for detachment of a main part of the wider portion from the fixed side edges. The tear lines may be rows of microperforations or score lines formed in the wider portion. Means for fixing the wider portion onto the end caps includes several options. One of the options comprises fastener rings which is fitted respectively around the end caps via the opposite side edges of the wider portion. The fastener rings press the opposite side edges of the wider portion against the end caps, and thereby firmly fasten the wider portion of the leader sheet to the end caps. Another option comprises perforated side edges of the wider portion locked onto projections on the end caps in combination with cover rings connected to the end caps. The cover rings define annular grooves in which the respective opposite side edges are received, and also prevent disengagement of the perforated side edges from the projections. These and other options are described in detail later in the description of preferred embodiments.

Accordingly, one manifestation of the present invention is a spooled photosensitive web cartridge which comprises an opaque, generally cylindrical core, a pair of opaque end caps, a length of photosensitive material, a leader sheet and a connecting means. The end caps are of a transverse outer size larger than the diameter of the core, and are disposed coaxially on the core at an axial distance between each other. The photosensitive material is wound onto that portion of the core between the end caps to form a cylindrical web of a diameter not greater than the transverse outer size of each end cap. The leader sheet is secured to the leading end of the photosensitive material, and includes an opaque wider portion which is circumferentially disposed entirely around the web to form a tubular enclosure for the photosensitive material. The wider portion of the leader sheet has a width greater than the axial distance between the end caps and has opposite side edges which extend circumferentially about the axis of the core. The connecting means detachably connects the opposite side edges of the wider portion respectively to the end caps so as to mechanically retain the tubular enclosure on the end caps as well as to provide a light-tight seal between the tubular enclosure and the end caps.

Another manifestation of the present invention is a spooled photosensitive web cassette which comprises a web cartridge, a take-up spool, and a cassette frame. The cassette frame holds the web cartridge together with the take-up spool. This cartridge is of the same structure as the web cartridge of the foregoing manifestation, and is connected to the cassette frame for rotational movement about its axis. The take-up spool is connected to the cassette frame for rotational movement about its axis, and has a cylindrical portion for both the leader sheet and the photosensitive material being wound thereonto. The cylindrical portion of the take-up spool is of an axial length not less than the axial distance between the pair of end caps of the web cartridge.

DETAILED DESCRIPTION OF THE PREFERRED EMBODIMENTS

Referring now to the drawings, like reference numerals in all views designate corresponding parts, and descriptions of these corresponding parts are omitted after being given once.

Figure 1:
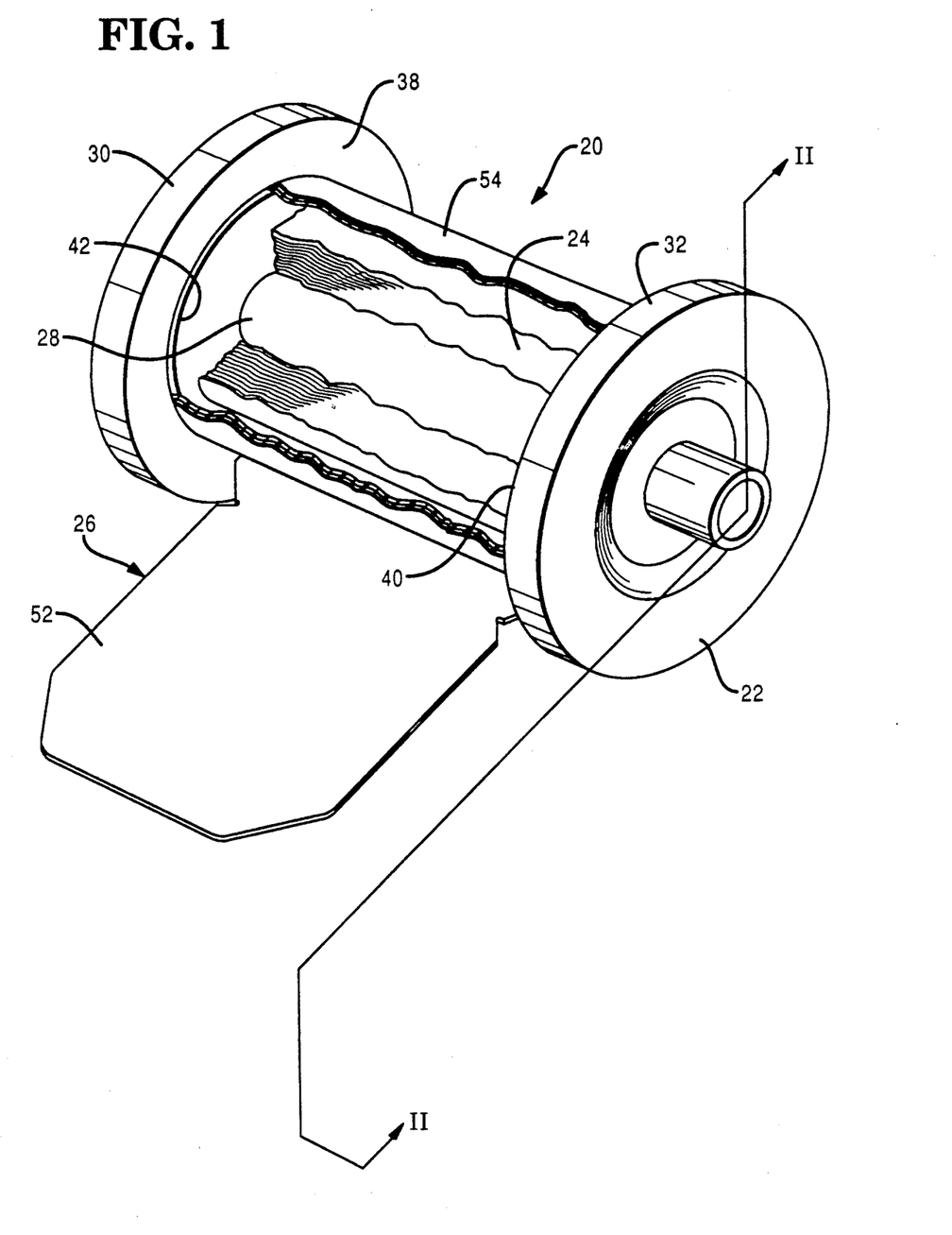
FIG. 1 is a perspective view, partly cut away, of a spooled photosensitive web cartridge according to the present invention.

FIGS. 1 to 4 illustrate an embodiment of the present invention, where FIG. 1 shows a spooled photosensitive web cartridge designed to be loaded in an imaging device. The spooled photosensitive web cartridge 20 comprises a spool 22 with a length of photosensitive material 24 wound therearound, and a leader sheet 26 secured to the leading end of the photosensitive material 24.

The spool 22 includes a generally cylindrical core 28 and a pair of end caps 30 and 32. In FIG. 1, the end caps 30 and 32 are shown as being of a disc-like configuration. However, the end caps 30 and 32 may be of any shape suitable for an imaging device into which the cartridge 20 is loaded. The end caps 30 and 32 are formed considerably larger in diameter than the core 29. Both the core 28 and the end caps 30 and 32 may be formed of any opaque material suitable to inhibit light transmission therethrough, and are typically made of an opaque synthetic resin. The end caps 30 and 32 are connected to the opposite end portions of the core 28 so that they are disposed coaxially with the core 28, with an axial distance ($S_1$) between the end caps (see FIG. 2). The connection between the core and the end caps may be accomplished by means of snap engagement, ultrasonic welding, gluing, or the like. Although the end caps 30 and 32 are shown as being connected onto the core 28, they may be connected to the inner surface of the core 28 by inserting a part of each end cap into the core 28. The distance ($S_1$) between the end caps 30 and 32 is generally equal or slightly greater than the width ($W_1$) of the photosensitive material 24 (see FIG. 4). Reference numerals 34 and 36 in FIG. 2 designate shoulders on the core 28, engaging with and properly positioning the end caps 30 and 32.

Figure 2:
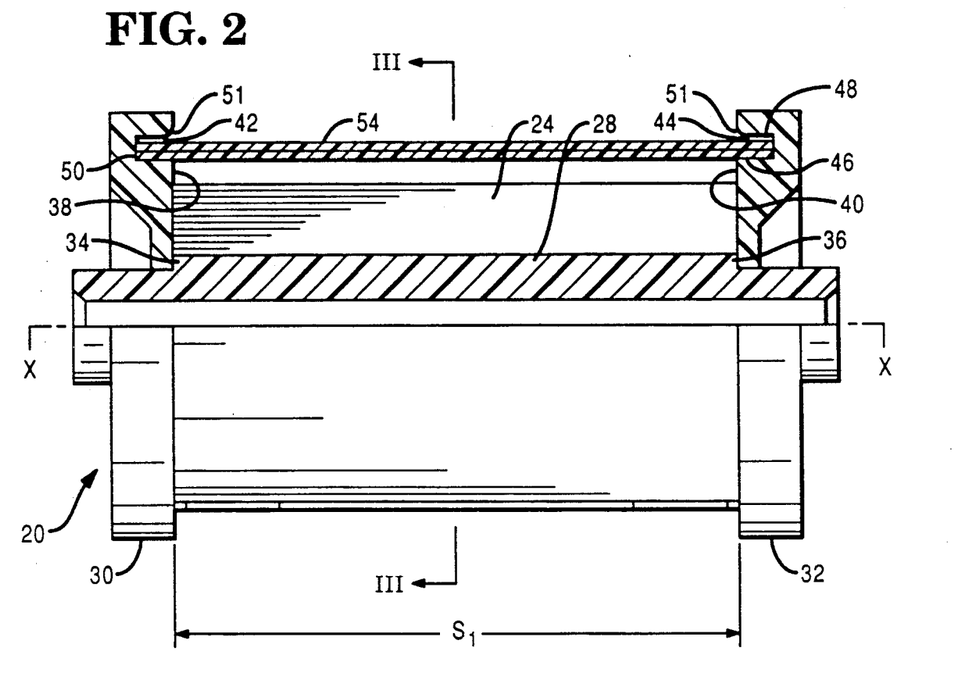
FIG. 2 is a view taken along the line II—II in FIG. 1.

As best shown in FIGS. 1 and 2, the end caps 30 and 32 have opposed parallel guide faces 38 and 40 which are generally perpendicular to the axis (X) of the core 28. These guide faces 38 and 40 are relatively smooth surfaces to slidably contact and guide the side edges of the photosensitive material 24. The end caps 30 and 32 also have annular grooves 42 and 44 formed in the guide faces 38 and 40, respectively. These annular grooves 42 and 44 extend circumferentially along the respective peripheries of the end caps 30 and 32. The annular grooves 42 and 44 have a generally rectangular cross-section or a substantially equivalent cross-section thereto. More particularly, each annular groove is defined by inner and outer cylindrical walls 46 and 48 and an annular end wall 50. An annular chamber 51 is formed between the outer cylindrical wall 48 and the corresponding guide face 38 or 40 to facilitate engagement and disengagement of the leader sheet 26 to and from the corresponding annular groove as will be described later. The peripheral portion of each end cap, as best shown in FIG. 2, is prepared larger in thickness than the balance of the end cap to accommodate the corresponding annular groove.

Figure 3:
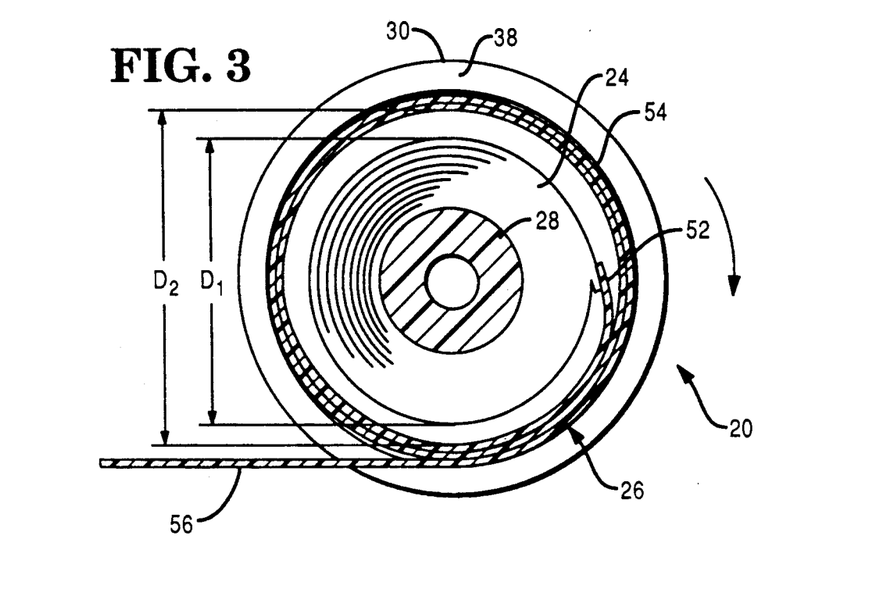
FIG. 3 is a view taken along the line III—III in FIG. 2.

The photosensitive material 24 may be any sheet material responsive to actinic radiation which needs to be sealed light tightly and be protected from external force until it is used on purpose. However, the photosensitive material is preferably an imaging material having a substrate and a layer of photosensitive microcapsules or microparticles on a surface thereof. Examples of such an imaging material applicable to the present invention are disclosed in U.S. Pat. Nos. 4,399,209 and 4,440,846 to The Mead Corporation. As illustrated in FIGS. 1 and 2, the photosensitive material 24 is wound onto that portion of the core 28 between the end caps 30 and 32 in such a manner that the photosensitive material 24 forms a cylindrical web which is disposed coaxially on the core 28. The length of the photosensitive material wound is predetermined depending on its thickness so that the diameter ($D_1$) of the web does not exceed the diameter ($D_2$) of the inner cylindrical wall 46 of each of the annular grooves 42 and 44. In FIG. 3, the diameter ($D_1$) of the web is shown as being less than the diameter ($D_2$) of the inner cylindrical wall 46; however, it may be substantially equal to the diameter ($D_2$). The diameter ($D_1$) smaller than the diameter ($D_2$) is preferable since it allows the web to be spaced from a portion of the leader sheet 26 as will be described later.

Figure 4:
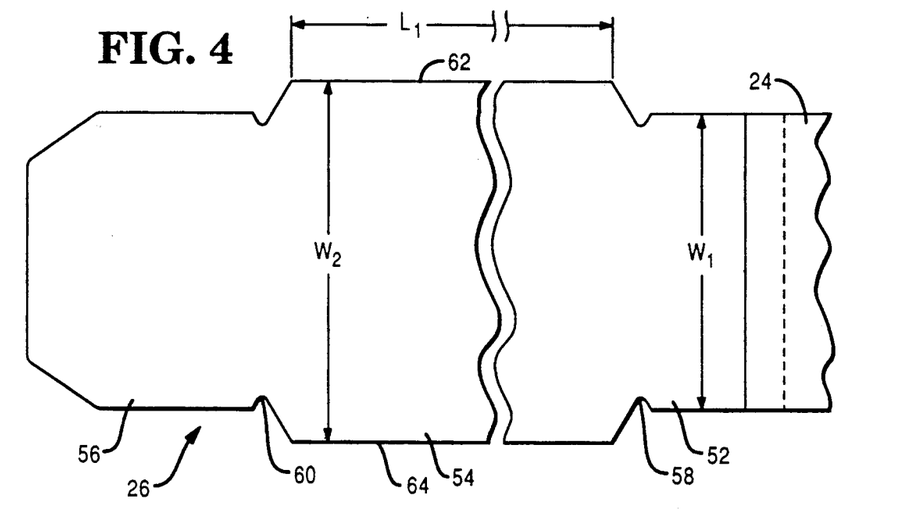
FIG. 4 is a plan view, partly omitted, of a leader sheet in FIG. 1.

The leader sheet 26 is formed of an opaque sheet material such as a plastic film and/or paper, which has some degree of stiffness. As shown in FIG. 4, the leader sheet 26 includes an initial portion 52, a wider portion 54, and a tail portion 56. The initial portion 52 is the part secured to the leading end of the photosensitive material 24 and having a substantially equal width to the width ($W_1$) of the photosensitive material 24. The initial portion 52 may be secured to the photosensitive material 24 by any means such as thermal welding, ultrasonic welding, gluing and the like. The tail portion 56 constitutes a free end located remotest from the leading end of the photosensitive material 24 and having a generally equal width to the width ($W_1$) of the photosensitive material 24. The wider portion 54 is interposed between the initial portion 52 and the tail portion 56 and is greater in width than the balance of the leader sheet 26. More particularly, the width ($W_2$) of the wider portion 54 is greater than the distance ($S_1$) between the end caps 30 and 32. The length ($L_1$) of the wider portion 54 is at least more than the circumference of the inner cylindrical wall 46 of each end cap. A neck 58 is provided between the initial portion 52 and the wider portion 54, and another neck 60 is provided between the wider portion 54 and the tail portion 56.

As shown in FIG. 3, the initial portion 52 is routed outward of the web along a tangent line from the leading end of the photosensitive material 24. The wider portion 54 continuous with the initial portion 52 is wrapped more than once (about twice in FIG. 3) in a direction indicated by the arrow around the web of the photosensitive material 24. As a result, the wider portion 54 forms a tubular or cylindrical enclosure which is radially spaced from the surface of the web. Such a tubular enclosure can be retained in its form by the opposite side edges 62 and 64 of the wider portion 54 inserted into the annular grooves 42 and 44, respectively. The opposite side edges 62 and 64 may be inserted or tucked respectively into the grooves 42 and 44 as the wider portion 54 is wrapped around the web. Alternatively, the wider portion 54 may be rolled up before the end caps 30 and 32 are assembled to the core 38 and then the opposite side edges may be captured respectively in the grooves 42 and 44 upon the assembly of the end caps 30 and 32. Further, the tail portion 56 extends outward of the cartridge 20 from the wound wider portion 54 to form a free end of a series of the windings 24 and 26. The neck 50 facilitates the insertion of the opposite side edges 62 and 64 adjacent thereto to the grooves 42 and 44, whereas the neck 58 helps the tail portion 56 to pop out from the spool 22.

As the wider portion 54 of the leader sheet 26 is wrapped around the web of the photosensitive material 24, the opposite side edges 62 and 64 of the wound wider portion 54 are tucked or captured in the annular grooves 42 and 44, light cannot be transmitted to the inside of the tubular wider portion 54. As a result, the web is completely shielded from light.

At the same time, the web is mechanically protected from external force by the surrounding tubular wider portion 54 whose opposite side edges 62 and 64 are frictionally connected with and supported by the end caps 42 and 44. That is, considering a part of the wider portion 54 as a simple beam which bridges between the end caps 30 and 32 (FIG. 2), the flexural rigidity of the rolled wider portion 54 against radial bending load is greater than it would be if the wider portion 54 were not rolled up but flat. Therefore, although the wrapped leader sheet 26 is a flexible sheet material, it can provide an appreciably stiff tubular enclosure. This helps prevent damage to the photosensitive material 24, which could otherwise be caused, for example, by diametrically crushing the cartridge 20 while handling it. The above-mentioned benefits provided by the wider portion 54 can be more assured by increasing the number of times the wider portion 54 is wrapped about the photosensitive material 24.

The width of each of the aforementioned annular grooves 42 and 44, i.e., the radial distance between the inner and outer cylindrical walls 46 and 48, should be fixed depending on the thickness of the leader sheet 26 as well as an appropriate number of times the wider portion 54 is wrapped. Preferably, the width of each annular groove is greater than the total thickness of layers of the wider portion 54 wrapped around the web so as to facilitate insertion and pulling-out of the opposite side edges 62 and 64 to and from the annular grooves 42 and 44. The mechanical protection function of the wider portion 54 may be further assured by keeping the diameter of the wrapped wider portion 54 at a relatively small size and still maintaining a space between the wider portion 54 and the surface of the web 24.

When the web cartridge 20 is loaded in an imaging device, tail portion 56 of the leader sheet 26 provides a free end and functions as means for the imaging device to automatically spool off and to load the photosensitive material 24. More specifically, the opposite ends of the core 28 are rotatably supported by an imaging device upon loading of the cartridge 20. When the tail portion 56 is pulled by the imaging device, the deployment force applied on the tail portion 56 exceeds the buckling force of the wider portion 54 and allows the opposite side edges 62 and 64 of the wider portion 54 to come free of or to be pulled out of the annular grooves 42 and 44. Accordingly, the photosensitive material 24 which is continuous with the leader sheet 26 can be smoothly spooled off. Since the enclosure for the web 24, that is, the wider portion 54, is removed from the cartridge 20 upon the spooling-off of the photosensitive material 24, there is no narrow pathway such as the outlet on an conventional-type cartridge which can damage the photosensitive material 24.

The mechanical strength of the tubular enclosure formed by the wider portion can be increased by increasing the flexual rigidity of the wider portion and/or by fixing or engaging the opposite side edges of the wider portion to the end caps.

Figure 5:
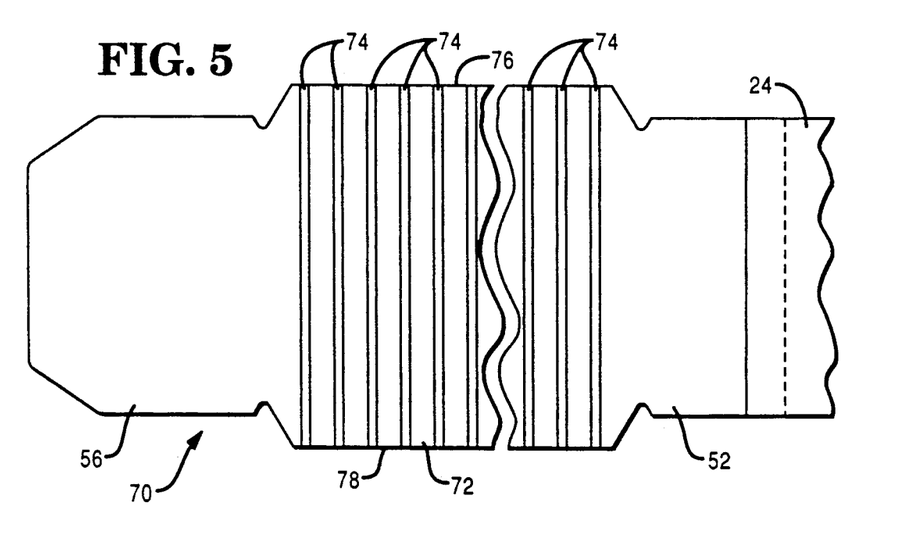
FIG. 5 is a plan view, partly omitted, of a modified form of the leader sheet in FIG. 4.
Figure 6:
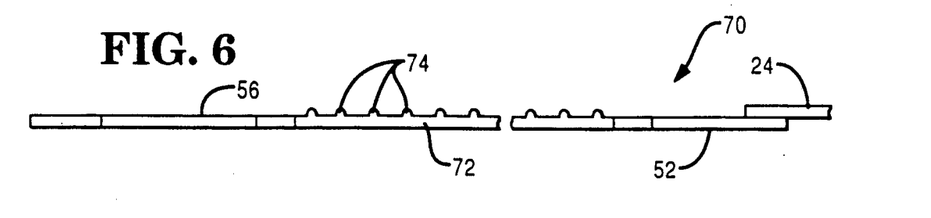
FIG. 6 is a side-elevation view, partly omitted, of the leader sheet in FIG. 5.

FIGS. 5 and 6 illustrate one example wherein a leader sheet 70 has a mechanical strength greater than that of the leader sheet 26 in FIG. 4. The leader sheet 70 has a wider portion 72 which is provided with a plurality of spaced parallel ridges 74 formed on its inner or outer side. Each of these ridges 74 extends between the opposite side edges 76 and 78 of the wider portion 72. Due to these ridges 74, the flexual rigidity of the wider portion 72 can be increased on the basis of increasing the second moment of inertia, in comparison with that of the wider portion 54 in FIG. 4. The ridges 74 may be formed on either or both the inner and outer sides of the wider portion 72; however, the thickness of the wider portion 72 including the ridges 74 should be less than the width of the annular grooves in the end caps in order to have the opposite side edges easily inserted in the annular grooves. Also, each ridge 74 should be small enough to allow smooth passing movement of the leader sheet 70 through the nip between rollers in imaging devices. For example, the height of each ridge is less than 0.005 inch formed on a 0.005 inch thick leader sheet. In addition, persons skilled in the art will appreciate that a corrugated wider portion can be used in place of the wider portion 72.

Figure 7:
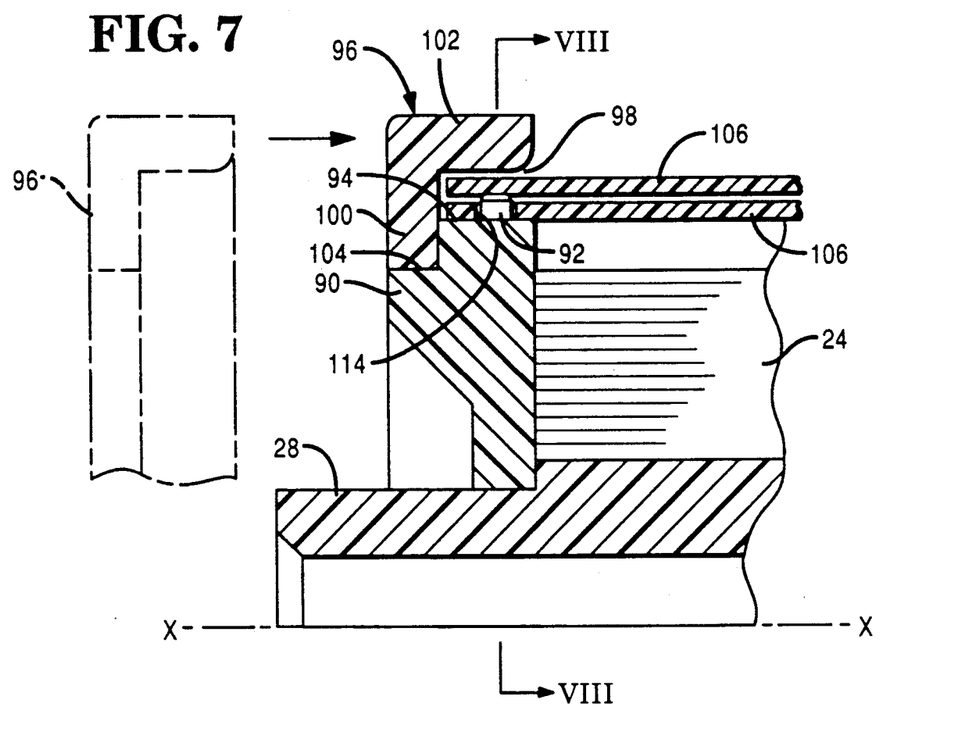
FIG. 7 is a fragmentary axial-sectional view of a form of the web cartridge in FIG. 1.
Figure 8:
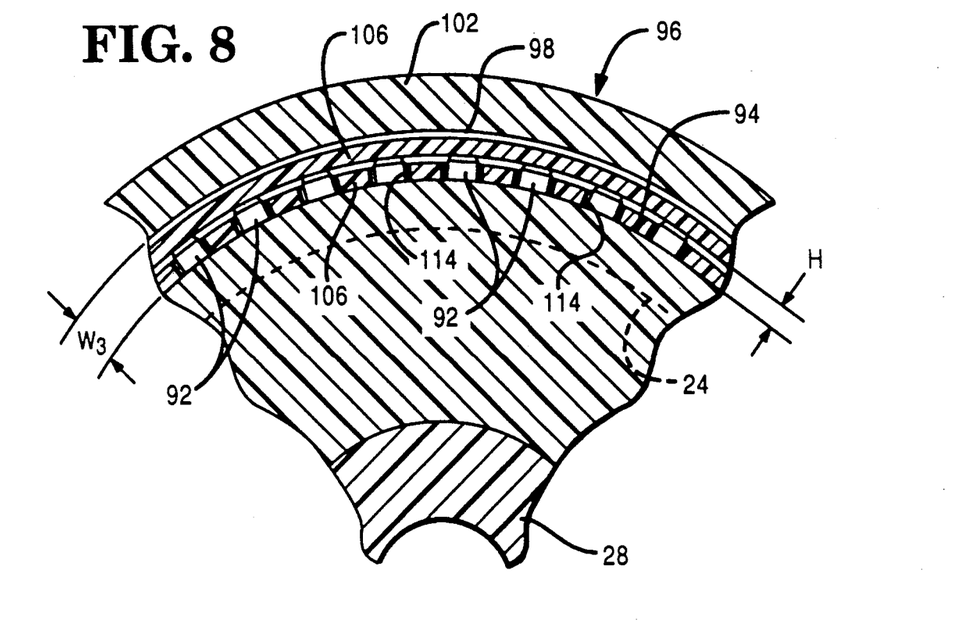
FIG. 8 is a view taken along the line VIII—VIII in FIG. 7.
Figure 9:
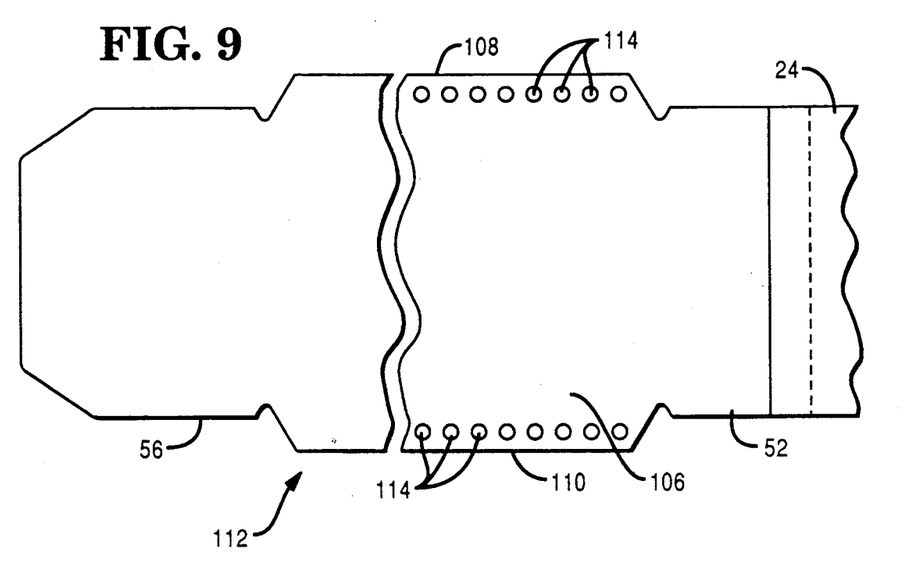
FIG. 9 is a plan view, partly omitted, of a leader sheet in FIG. 7.

FIGS. 7 to 9 illustrate a spooled web cartridge in which the opposite side edges of a wider portion are engaged with the end caps, respectively. As shown in FIGS. 7 and 8, end caps 90 (only one is shown) are provided with a plurality of cylindrical projections or pins 92. These projections 92 are fixedly disposed on the cylindrical peripheral face 94 of each end cap 90 at angular intervals about the axis (X) of a core 28. Each end cap 90 with the projections 92 may be of a unitary construction formed by a plastic molding.

Referring further to FIGS. 7 and 8, a cover ring 96 which may also be made of a plastic material is disposed on each end cap 90 so as to form an annular groove 98 between the cover ring 96 and the corresponding end cap 90. More specifically, the cover ring 96, as best shown in FIG. 7, includes first and second annular portions 100 and 102 such that the cover ring 96 has an essentially L-shaped axial cross-section. The first annular position 100 is coaxially connected to the periphery of the corresponding end cap 90 with the inner periphery thereof accommodated by a cut-off 104 formed in the corresponding end cap 90. The second annular portion 102 extends from the outer periphery of the first annular portion 100 toward the opposing cover ring (not shown) on the other end cap (not shown), and is circumferentially disposed over the peripheral face 94 of the corresponding end cap 90 at a radial distance ($W_3$) from the peripheral face 94. As a result, the aforementioned annular groove 98 circumferentially extending along the periphery of each end cap 90 is defined between the peripheral face 94 of each end cap 90 and the corresponding cover ring 96. The radial distance ($W_3$), that is, the width of the annular groove 98 is greater than the sum of the thicknesses of the layers of the wider portion 106 of a leader sheet 112, and is also greater than the height (H) of each projection 92. The difference between the width ($W_3$) and the height (H), i.e., the distance between the second portion 102 and the projections 92, exceeds the thickness of one of the layers of the wider portion 106 to allow the corresponding side edge 108 or 110 (see FIG. 9) to come free of the annular groove 98 when the tail portion 56 is pulled to unroll the photosensitive material 24.

As shown in FIG. 9, the wider portion 106 of the leader sheet 112 is provided with two rows of circular perforations 114 for receiving the projections 92 of the end caps 90. The two rows of perforations 114 are disposed at intervals along the opposite side edges 108 and 110 of the wider portion 106, respectively. Each perforation 114 is of an inner diameter slightly larger than the diameter of each projection 92, and thereby permits the corresponding projection 92 to easily come free of the perforation when the tail portion 56 is pulled to unroll the photosensitive material 24. In FIGS. 7 to 9, only the half of the wider portion 106 adjoining the initial portion 52 has the perforations 114, and is thereby engaged with the projections 92. The length of this half of the wider portion 106 is generally equal to the circumference of each end cap 90. However, the perforations may be provided along the entire length of the wider portion 106.

To assemble the cartridge shown in FIGS. 7 and 8, a photosensitive material 24 with the leader sheet 112 is wound onto a spool which is constituted of a core 28 and the end caps 90, i.e., a spool without the cover rings 96. The resultant web of the photosensitive material 24, preferably, is of a diameter appreciably less than the diameter of each end cap 90. The wider portion 106 of the leader sheet 112 is wrapped more than once around the web of the photosensitive material 24 with the opposite side edges 108 and 110 of the wider portion 106 disposed along the peripheral faces 94 of the end caps 90. Each perforated side edge of the wider portion 106 is engaged with the projections 92 on the corresponding end cap 90 as shown in FIGS. 7 and 8, whereas each unperforated side edge of the wider portion 106 is simply placed on or over the projections 92. After the wrapping of the leader sheet 112 is completed, each cover ring 96 is assembled to the corresponding end cap 90 in a manner shown by the phantom line and the arrow in FIG. 7. As a result, each side edge of the wider portion 106 is captured in the corresponding annular groove 98, and thereby even the unperforated side edges of the wider portion 106 are frictionally connected to the projections 92 and/or the cover rings 96. Each cover ring 96 may be attached to the corresponding end cap 90 by means of thermal welding, ultrasonic welding, gluing, snap engagement or the like.

Since the perforated side edges 108 and 110 of the wider portion 106 lock onto the projections 92 in the annular grooves 98, the rolled wider portion 106 shows excellent mechanical strength against external force such as radial force applied during handling of the cartridge. Other advantages are also obtained by this arrangement. One of the advantages is that the wider portion 106 which is engaged with the end caps 90 ties the end caps 90 together, thereby restraining movement of the end caps 90 along the core 90. Therefore, the end caps 90 may be merely fitted to the core 28 without gluing or welding. It is another advantage of this arrangement that the engaged wider portion 106 retains the photosensitive material 24 being wound on the core and prevents the web from being loosened.

Figure 10:
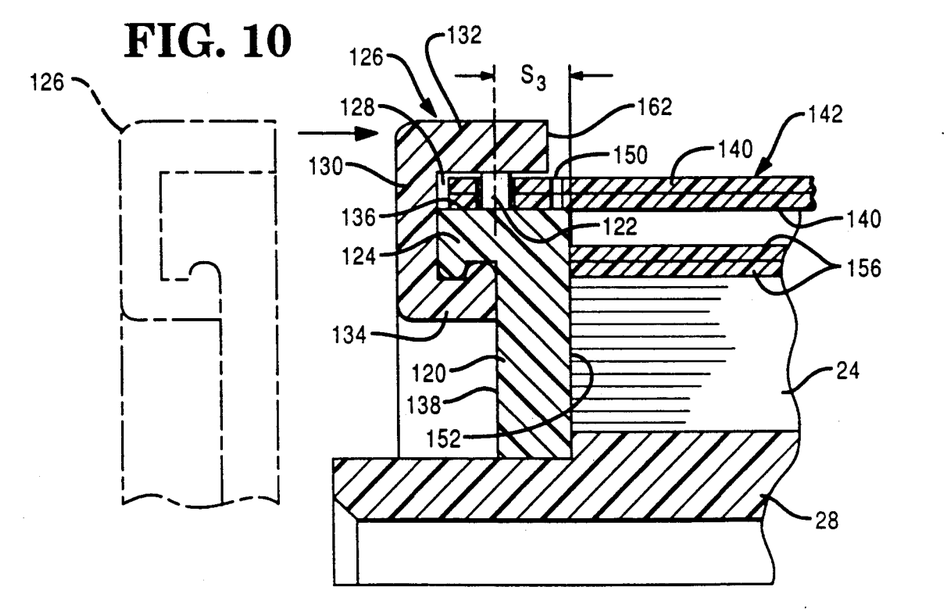
FIG. 10 is a fragmentary axial-sectional view of a web cartridge according to another embodiment of the present invention.
Figure 11:
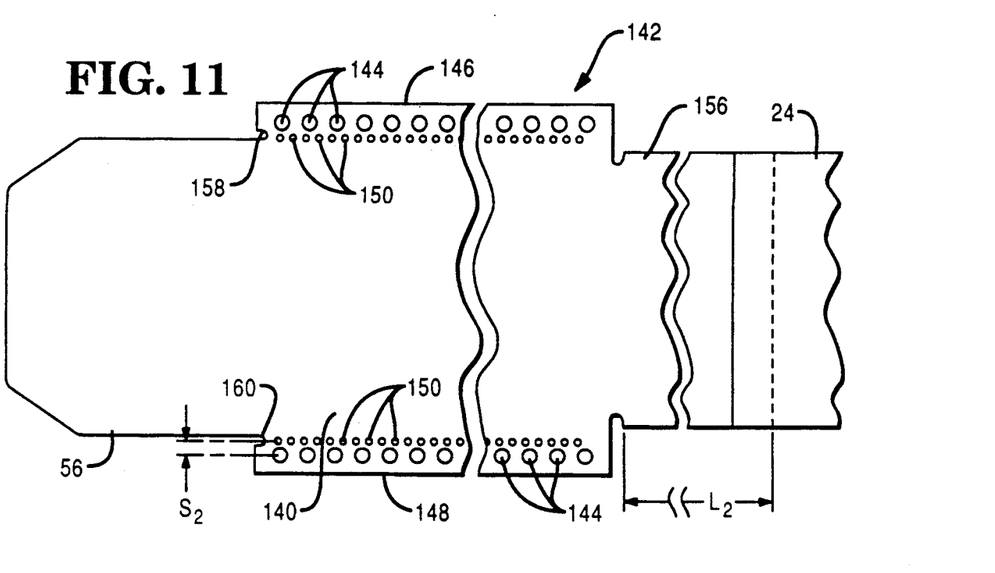
FIG 11 is a plan view, partly omitted, of a leader sheet in FIG. 10.

FIGS. 10 and 11 illustrate a spooled web cartridge in which the opposite side edges of a wider portion are fixed to end caps. As shown in FIG. 10, the end caps 120 (only one is shown) of this cartridge are provided with a plurality of cylindrical projections 122 (only one is shown) in a manner similar to the foregoing embodiment, and each end cap 120 has an annular engaging flange 124 formed coaxially on its outer face 138. A cover ring 126 is connected coaxially to corresponding end cap 120 so as to form an annular groove 128 therebetween. More particularly, the cover ring 126 includes first, second and third annular portions 130, 132 and 134 such that the cover ring 126 has an essentially C-shaped axial cross-section. The third annular portion 134 engages with the annular engaging flange 124 of the corresponding end cap 120. The first annular portion 130 extends radially outward from the third annular portion 134, and is disposed along the annular engaging flange 124. The second annular portion 132 extends from the outer periphery of the first annular portion 130 toward the opposing cover ring (not shown) on the other end cap (not shown), and is disposed on the tops of the projections 122 of the cap 120. Stated differently, the aforementioned annular groove 128 is defined between the second annular portion 132 and the peripheral face 136 of the corresponding end cap 120, and each projection 122 extends across the corresponding annular groove 128 to firmly contact the second annular portion 132 of the corresponding cover ring 126. The width of the annular groove 128 is greater than the sum of the thicknesses of the layers of the wider portion 140 of a leader sheet 142.

Referring to FIG. 11, the wider portion 140 of the leader sheet 142 is provided with two rows of circular perforations 144 for receiving the projections 122 of the end caps 120. The two rows of perforations 144 are disposed at intervals along the entire opposite side edges 146 and 148 of the wider portion 140, respectively. Each perforation 144 is of an inner diameter slightly larger than the diameter of each projection 122. Each side edge of the wider portion 140, as shown in FIG. 10, is received in the corresponding annular groove 128 and also is engaged with the projections 122 by means of the perforations 144. The engaged side edges of the wider portion 140 are prevented from disengagement by the cover rings 126. Returning to FIG. 11, the wider portion 140 is also provided with two rows of microperforations or fine holes 150 which function as tear lines for tearing the wider portion 140 therealong. The two rows of microperforations 150 are disposed parallel to and almost entirely along the two rows of perforations 144. Each row of microperforations 150 is located farther from the corresponding side edge of the wider portion 140 than the corresponding row of perforations 144, and is disposed at a distance ($S_2$) from the corresponding row of perforations 144. The distance ($S_2$) may be appreciably shorter than the distance ($S_3$) between each projection 122 and the guide face 152 of the corresponding end cap 120, as shown in FIG. 10. This arrangement results in each row of microperforations 150 being positioned on the peripheral face 136 of the end cap 120, as shown also in FIG. 10, and thereby light transmission through the microperforations 150 is obstructed. Reference numerals 158 and 160 in FIG. 11 designate notches for facilitating tearing along the microperforations 150. The initial portion 156 of the leader sheet 142 has a length ($L_2$) greater than the circumference of the web of the photosensitive material 24, and thus is wound onto the web to assure the light tightness as shown in FIG. 10.

As further shown in FIG. 10, the cover ring 126 is designed such that the free end face 162 of the second annular portion 132 may not be flush with the guide face 152 of the corresponding end cap 120 upon engagement but is slightly drawn back from a plane flush with the guide face 152 to almost expose the microperforations 150. In other words, the two rows of microperforations 150 are positioned between the free end faces 162 (only one is shown) of the cover rings 126, and thus are visible from the outside. Preferably, the inner peripheral edge of the free end face 162 is disposed immediately over the corresponding row of microperforations 150 to function as a blade for helping the wider portion 140 to be torn along the microperforations 150. From this view point, the free end face 162 and the adjoining inner cylindrical face of the second annular portion 132 may define an acute angle therebetween although the corresponding angle in FIG. 10 is shown in as being a right angle.

To assemble the cartridge shown in FIG. 10, a photosensitive material 24 with the leader sheet 142 is wound onto a spool without the cover rings 126. The initial portion 156 of the leader sheet 142 is wound more than once onto the web of the photosensitive material 24. The wider portion 140 of the leader sheet 142 is wrapped more than once around the initial portion 156 with the opposite side edges 146 and 148 locked onto the projections 122 on the end caps 120. Thereafter, each cover ring 126 is assembled to the corresponding end cap 120 by means of the third annular portion 134 and the engaging flange 124 in a manner shown by the phantom line and the arrow in FIG. 10. Each side edge of the wider portion 106 is thus captured in the corresponding annular groove 128 and is fixed onto the corresponding end cap 120. Since the perforated side edges 146 and 148 of the wider portion 140 are fixed on the end caps 120, the rolled wider portion 140 shows excellent mechanical strength against external force equal to that of the embodiment of FIG. 7. It is preferred that the web of the photosensitive material 24 is of a diameter less than the diameter of each end cap 120, and that the wider portion 140 is radially spaced from the outer surface of the initial portion 156.

After loading the web cartridge of FIG. 10 into an imaging device, the photosensitive material 24 with the leader sheet 142 is spooled off in the following manner. When the tail portion 56 is pulled, the wider portion 140 is torn, due to the deployment force, along the two rows of microperforations 150. That is, the perforated edges 146 and 148 remain in the annular grooves 128, and only that portion of the wider portion 140 between the two rows of microperforations 150 is spooled off.

Figure 12:
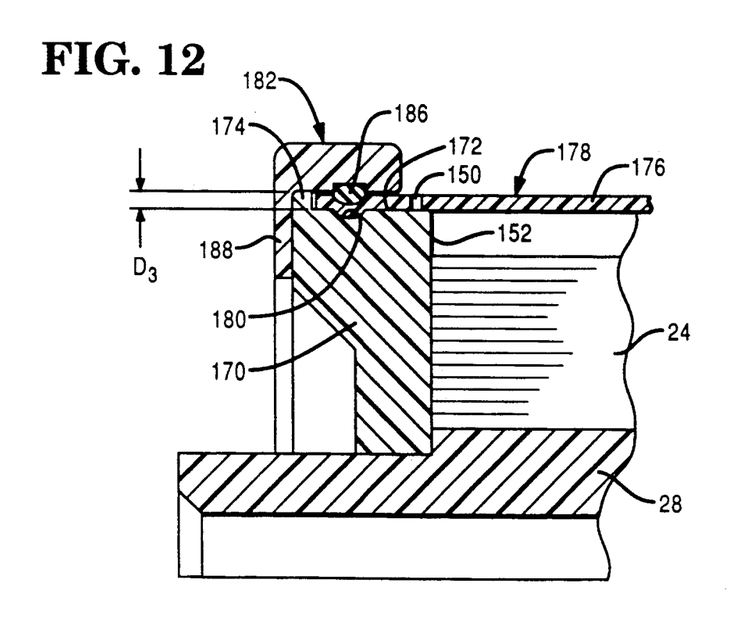
FIG. 12 is a fragmentary axial-sectional view of a modified form of the web cartridge in FIG. 10.
Figure 13:
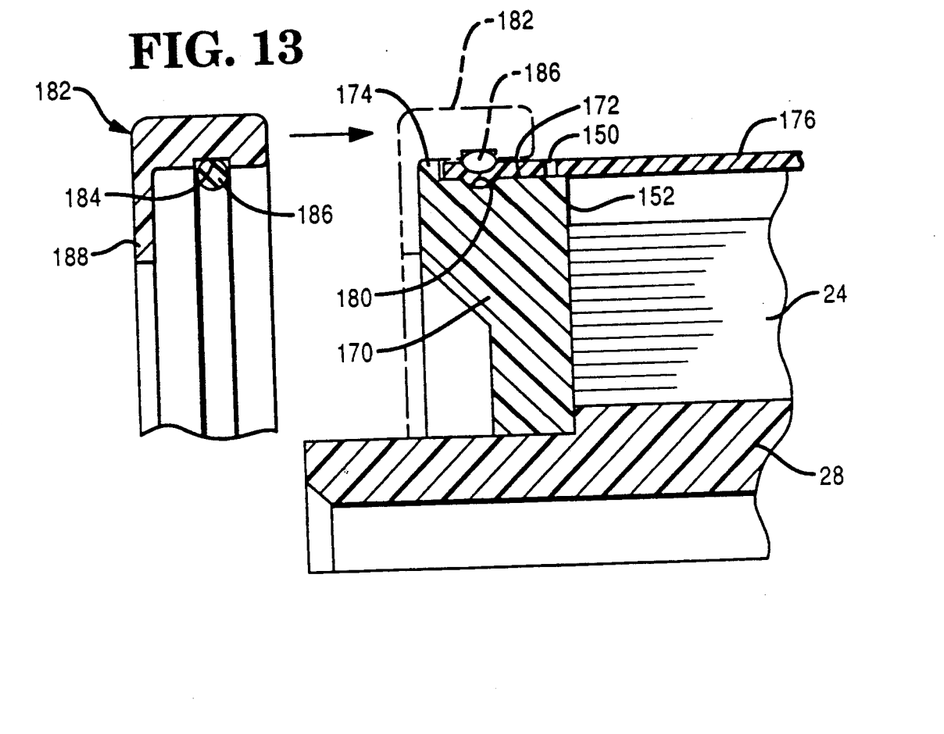
FIG. 13 illustrates engaging processing of a fastener ring to an end cap in FIG. 12.

FIGS. 12 and 13 illustrate a web cartridge in which the opposite side edges of a wider portion are fixed to end caps in a different manner. End caps 170 (only one is shown) of this cartridge do not have projections but have depressions 172 formed in their respective peripheral faces. Each depression 172 opens not only to the corresponding peripheral face but also to the guide face 152, and circumferentially extends entirely along the peripheral face. Reference numeral 174 denotes a shoulder formed as a result of formation of the depression 172. The depression 170 is formed to receive the correspond side edge of the wider portion 176 of a leader sheet 178 as shown in FIG. 12. The depth (D3) of the depression 172 in FIG. 12 is shown as being generally equal to the thickness of the wider portion 176. However, the depth (D3) depends on the number of layers stacked on the corresponding end cap 170. Further, a recess 180 is formed in the bottom of the depression 172 of corresponding end cap 170. The recess 180 also circumferentially extends entirely around the corresponding end cap 170.

The leader sheet 178 used in the web cassette in FIG. 12 is similar to that shown in FIG. 11 except that no engaging perforations are provided. The initial portion of the leader sheet 178 may be of a length longer than the circumference of the web of a photosensitive material 24; however, the initial portion is omitted in FIGS. 12 and 13. The wider portion 176 is wrapped around the web 24 with its opposite side edges disposed on and along the peripheral faces of the end caps 170.

Further in this modification, fastener rings 182 (only one is shown) are used in place of the cover rings 126. Each fastener ring 182 is of an essentially simple ring-shaped configuration having a groove 184 formed in its inner face (see FIG. 13). An O-ring 186 is trapped in the groove 184 or integral with the corresponding fastener ring 182. The fastener rings 182 are engaged with and fitted around the respective end caps 170 via the wider portion 176 to fasten the opposite side edges of the wider portion 176 to the end caps 170. These fastener rings 182 are assembled onto the end caps 170 in a manner shown in FIG. 13 after the wider portion 176 is wrapped around the web. Upon the engagement of each fastener ring 182, the corresponding O-ring 186 presses the corresponding side edge of the wider portion 176 into the corresponding recess 180, and thereby each of the side edges of the wider portion 176 is firmly engaged with the corresponding end cap 170. The shoulder 174 and the depression 172 of each end cap help the corresponding fastener ring 182 to properly fasten the corresponding side edge of the wider portion 176. Reference numeral 188 designates a stopper portion in contact with the corresponding end cap 170. The stopper portion 188 restrains further movement of the corresponding fastener ring 182.

Figure 14:
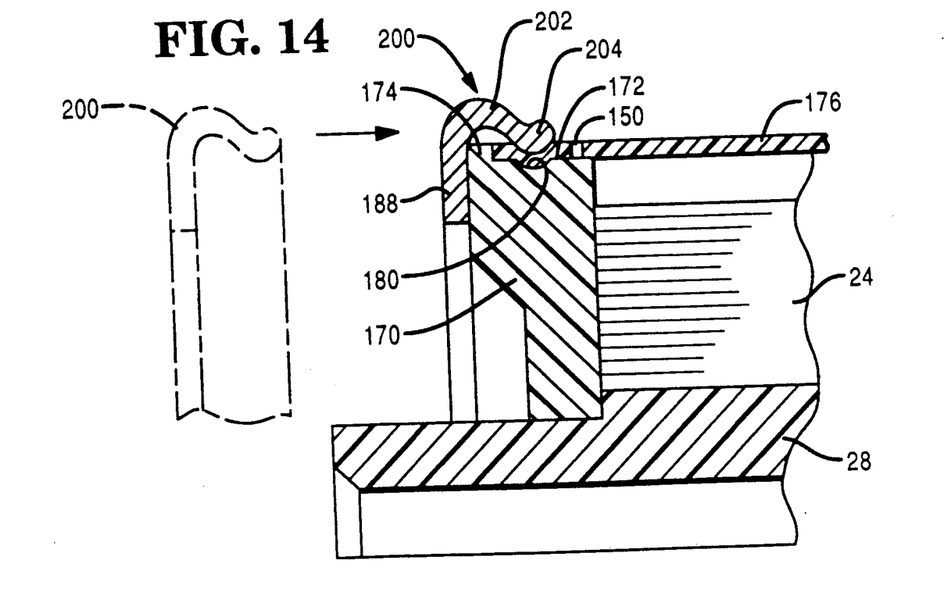
FIG. 14 is a fragmentary axial-sectional view of another modified form of the web cartridge in FIG. 10.

FIG. 14 shows a web cartridge similar to the cartridge in FIG. 12 except for modified fastener rings 200 (only one shown). A ring-shaped main portion of each fastener ring 200 excluding a stopper portion 188 is formed such that the main portion has a curved axial cross-section. More specifically, the main portion includes first and second subsections 202 and 204. The first subsection 202 which adjoins the stopper portion 188 is convexly curved so as to have a larger inner diameter than each end cap 170. The second subsection 204 which constitutes the free end of the main portion is concavely curved so as to have a smaller diameter than each end cap 170. The fastener rings 200 are snapped onto the end caps 170 as shown by the phantom line and the arrow. Upon the snapping engagement, the second subsection 204 functions in the same manner as the aforementioned O-ring 186 and presses the corresponding side edge of a wider portion 176 into a recess 180. The fastener ring 200 may be formed of a resilient material such as a plastic or a metal. The fastener ring 200 may be provided with a plurality of slits formed in the main portion to increase its flexibility. These slits may extend from the free end of the main portion to the first subsection 202, and be circumferentially disposed at angular intervals about the axis of the corresponding fastener ring 200.

While fastener rings are described in detail in reference to FIGS. 12 and 14, persons skilled in the art will appreciate that fastener rings, each having a circumferentially disposed annular ridge on its inner face, are also useful in the present invention. In this case, the annular ridge may be formed of an elastic material and may be integral with the corresponding fastener ring.

Figure 15:
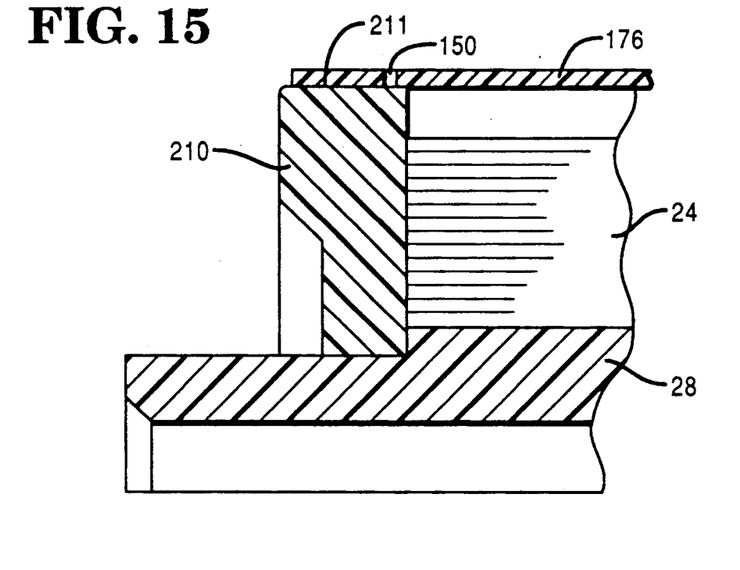
FIG. 15 is a fragmentary axial-sectional view of a further modified form of the web cartridge in FIG. 10.

FIG. 15 shows a web cartridge in which the opposite side edges of a wider portion 176 are fixedly attached to the peripheral face of end caps 210 (only one is shown). Each end cap 210 is of a simple disc-shaped construction having the shown plane cylindrical peripheral face 211. To attach a wider portion 176, any suitable bonding means such as ultrasonic welding, thermal welding, gluing, etc., may be used. However, ultrasonic welding is preferred when the wider portion 176 is wrapped more than once around the web 24. The bonding surface does not include the area between the microperforations 150 and between the two parallel rows of microperforations.

Figure 16:
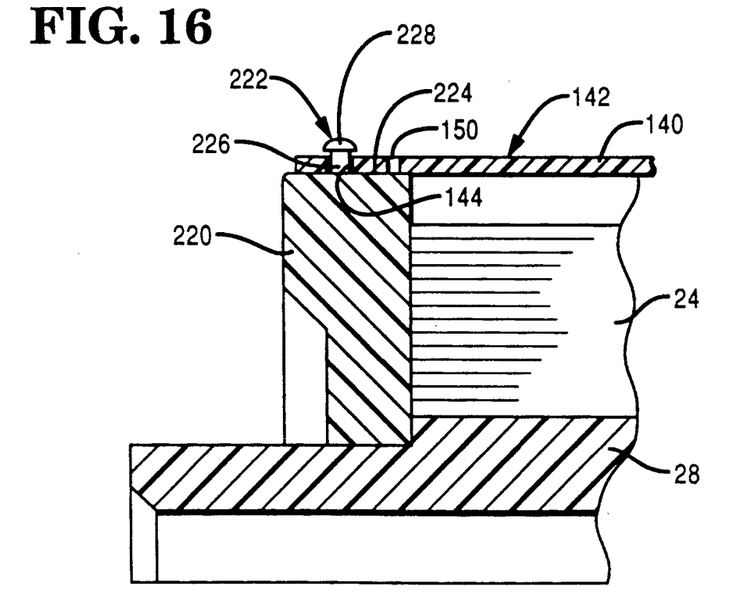
FIG. 16 is a fragmentary axial-sectional view of a further modified form of the web cartridge in FIG. 10.

FIG. 16 illustrates a web cartridge having another arrangement for fixing the opposite side edges of a wider portion 140 to end caps 220 (only one is shown). Each end cap 220 is provided with a plurality of projections 222 (only one is shown) circumferentially disposed on its cylindrical peripheral face 224 at angular intervals about the axis thereof. Each projection 222 includes a cylindrical stem 226 having a head portion 228 on top of the stem 226. The end caps 220 which include the projections 222 may be made of a thermoplastic resin. To assemble such a cartridge, the wider portion 140 of a leader sheet 142 is locked onto the projections 222 which are not yet provided with the head portions 228. Thereafter, the head portions 228 are formed ultrasonically. Naturally, the transverse outer size of each head portion is greater than the inner diameter of each perforation 144 so that the opposite side edges of the wider portion 140 are prevented from coming out of the projections 222. The initial portion of the leader sheet 142 is omitted in FIG. 16.

Figure 17:
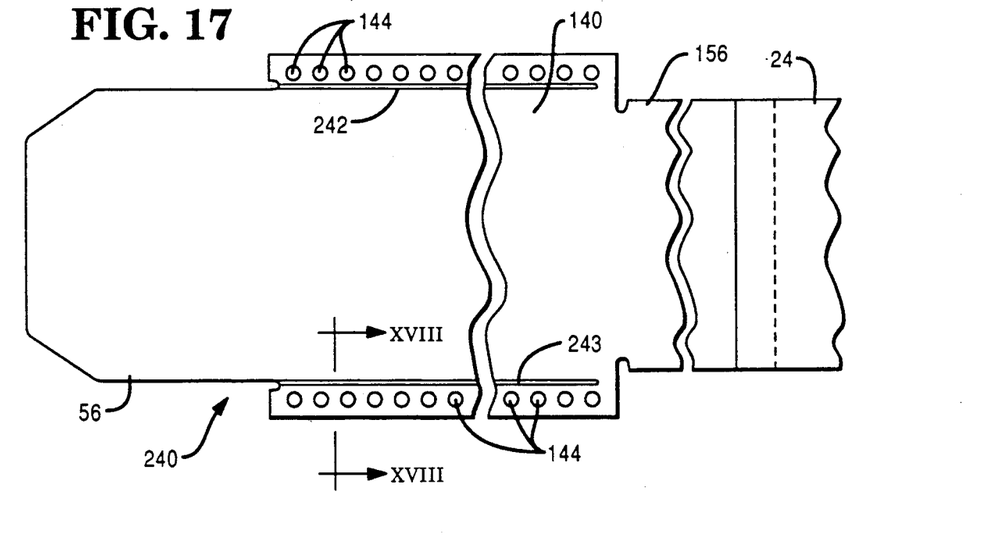
FIG. 17 is a plan view, partly omitted, of a modified form of the leader sheet in FIG. 11.
Figure 18:
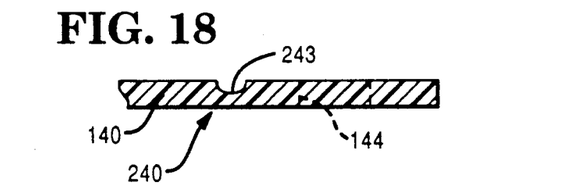
FIG. 18 is a view taken along the line XVIII—XVIII in FIG. 17.

FIG. 17 illustrates a leader sheet optionally useful in the cartridges of the foregoing embodiments, particularly in the cartridges shown in FIGS. 10, 12 and 16. This leader sheet 240 has score lines 242 and 243 in place of the two rows of microperforations 150. The score lines 242 and 243 may be formed in the inner side and/or the outer side of the wider portion 140. However, the score lines 242 and 243 formed in the inner side of the wider portion 140 as shown in FIG. 18 is preferred to easily and smoothly tear the wider portion 140 therealong. Employment of such a leader sheet 240 having no possible passage for light can further ensure the light tightness of the cartridges. It is readily apparent that the leader sheet 240 does not need to have the perforations 144 where it is employed in the cartridges in FIGS. 12, 14 and 15. It is also apparent that the longer initial portion 156 is of utility in any of the foregoing embodiments.

Figure 19:
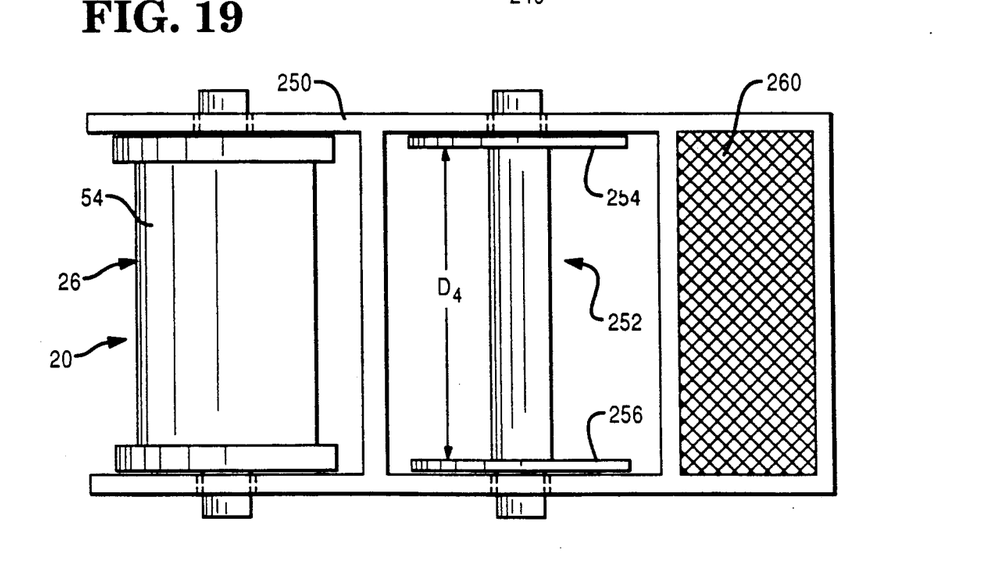
FIG. 19 is a plan view of a spooled photosensitive web cassette in accordance with the present invention.

Persons skilled in the art will appreciate that the cartridge according to the present invention can also be used in imaging devices which require use of cassettes having take-up spools. An example of photosensitive web cassettes, which employs a web cartridge in accordance with the present invention and can be used in a cassette-requiring device is shown in FIG. 19. This cassette employs a spooled photosensitive web cartridge 20 shown in detail in FIG. 1. A frame 250 is also employed to hold both the cartridge 20 and a take-up spool 252 for rotational movement about their respective axes. The frame 250 is shown as being of a generally H-shaped profile; however, it may be of any simple structure which can rotatably retain two spools at the same time. Needless to say, the frame 250 does not have to light-tightly enclose the cartridge 20 and the spool 252. The distance ($D_4$) between the end caps 254 and 256 of the take-up spool 252 may be not less than the width of the wider portion 54 so that the leader sheet 26 which includes the wider portion 54 can be appropriately wound onto the take-up spool 252. Further, the frame 250 may have a filter unit 260 where a specific imaging process requires a filtration system. While the cassette in FIG. 19 employs the cartridge 20, any of other cartridges described in the foregoing embodiments is useful in this cassette. When the cartridge in FIG. 10, for example, is employed in place of the cartridge 20, the distance ($D_4$) is not less than the distance between the two rows of the microperforations. In any event, the distance ($D_4$) is not less than the axial distance between the end caps of a web cartridge of the present invention.

Having described the invention in detail and by reference to the preferred embodiments thereof, it will be apparent that modifications and variations are possible without departing from the scope of the invention defined in the appended claims.

What is claimed is:

1. A spooled photosensitive web cartridge comprising:
    an opaque, generally cylindrical core;
    a pair of opaque end caps, each having an axis and a transverse outer size larger than the diameter of said core, said pair of end caps being disposed coaxially on said core at an axial distance between each other;
    a length of photosensitive material wound onto that portion of said core between said pair of end caps to form a cylindrical web of a certain diameter not greater than said transverse outer size;
    a leader sheet secured to a leading end of said photosensitive material, said leader sheet including an opaque wider portion circumferentially disposed entirely around said web to form a tubular protection means for said photosensitive material, said wider portion having a width greater than said axial distance between said pair of end caps and having opposite side edges extending circumferentially about the axis of said core, said tubular protection means having a substantially linear cross section taken along the axis of said core entirely along the width of said wider portion; and
    means for detachably connecting said opposite side edges of said wider portion respectively to said pair of end caps so as to mechanically retain said tubular protection means on said pair of end caps as well as to provide a light-tight seal between said tubular protection means and said pair of end caps.

2. The cartridge of claim 1 wherein said pair of end caps have guide faces respectively, said guide faces being generally perpendicular to the axis of said core and being opposed to each other, and
    said detachably connecting means comprises said guide faces having annular grooves formed respectively therein, said annular grooves being of a similar configuration and extending generally circumferentially about the axis of said core and receiving said opposite side edges of said wider portion respectively.

3. The cartridge of claim 2 wherein each of said pair of end caps has inner and outer cylindrical walls defining the corresponding one of said annular grooves, said inner and outer cylindrical walls being disposed coaxially with each other at a radial distance substantially greater than the thickness of said wider portion so that said opposite side edges of said wider portion are loosely received in said annular grooves respectively.

4. The cartridge of claim 3 wherein said certain diameter of said web is less than the diameter of said inner cylindrical wall so that said wider portion is essentially radially spaced from the outer surface of said web.

5. The cartridge of claim 4 wherein said wider portion has a plurality of ridges formed on at least one of the opposite surfaces thereof, each of said ridges extending between said opposite side edges.

6. The cartridge of claim 3 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

7. The cartridge of claim 6 wherein said certain diameter of said web is less than the diameter of said inner cylindrical wall; and
    said wider portion is essentially radially spaced from the outer surface of said initial portion.

8. The cartridge of claim 1 wherein said pair of end caps have cylindrical peripheral faces respectively, each of said peripheral faces being generally parallel to and extending circumferentially about the axis of said core, and
    said wider portion bridges the distance between said pair of end caps with said opposite side edges placed on and extending along said peripheral faces respectively.

9. The cartridge of claim 8 wherein said detachably connecting means comprises a pair of cover rings of an essentially L-shaped axial section, said pair of cover rings being disposed on and extending around said pair of end caps respectively in such a manner that each of said pair of cover rings defines in cooperation with the corresponding one of said peripheral faces an annular groove which receives the corresponding one of said opposite side edges of said wider portion.

10. The cartridge of claim 9, each of said pair of cover rings includes first and second annular portions, said first annular portion being connected to the corresponding one of said pair of end caps, said second annular portion being connected to said first annular portion and being disposed over the corresponding one of said peripheral faces at a radial distance from the corresponding one of said peripheral faces, said radial distance being substantially greater than the thickness of said wider portion so that said annular groove loosely receives the corresponding one of said opposite side edges of said wider portion.

11. The cartridge of claim 10 wherein said detachably connecting means further comprises:
    said wider portion having a plurality of perforations formed therein, said perforations being arranged at intervals along each of said opposite side edges of said wider portion; and a plurality of projections circumferentially disposed on each of said peripheral faces of said pair of end caps at angular intervals about the axis of said core, each of said projections being releasably received in a corresponding one of said perforations, said projections being spaced from said second annular portion of the corresponding one of said cover rings so that the distance between said projection and said second annular portion exceeds the thickness of said wider portion.

12. The cartridge of claim 11 wherein said pair of end caps are of a diameter greater than said certain diameter of said web so that said wider portion is essentially radially spaced from the outer surface of said web.

13. The cartridge of claim 12 wherein said wider portion has a plurality of ridges formed on at least one of the opposite surfaces thereof, each of said ridges extending between said opposite side edges.

14. The cartridge of claim 11 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

15. The cartridge of claim 14 wherein said pair of end caps are of a diameter greater than said certain diameter of said web; and said wider portion is essentially radially spaced from the outer surface of said initial portion.

16. The cartridge of claim 8 wherein said detachably connecting means comprises:

means for fixing said opposite side edges of said wider portion respectively on said peripheral faces of said pair of end caps; and two tear lines provided on said wider portion, each of said tear lines extending along a corresponding one of said opposite side edges of said wider portion whereby that portion of said wider portion between said two tear lines is capable of being detached from the balance of said wider portion along said tear lines.

17. The cartridge of claim 16 wherein each of said tear lines is formed of a plurality of microperforations formed in said wider portion, and said microperforations are positioned on the corresponding one of said peripheral faces of said pair of end caps so as to prevent light transmission through said microperforations.

18. The cartridge of claim 16 wherein each of said tear lines is formed of a score formed in at least one of the opposite surfaces of said wider portion.

19. The cartridge of claim 16 wherein said fixing means comprises:

a pair of cover rings of an essentially L-shaped axial section, said pair of cover rings being disposed on and extending around said pair of end caps respectively in such a manner that each of said pair of cover rings defines in cooperation with the corresponding one of said peripheral faces an annular groove which receives the corresponding one of said opposite side edges of said wider portion, each of said pair of cover rings including first and second annular portions, said first annular portion being connected to the corresponding one of said pair of end caps, said second annular portion being connected to said first annular portion and being disposed over the corresponding one of said peripheral faces at a radial distance from the corresponding one of said peripheral faces;

said wider portion having a plurality of perforations formed therein, said perforations being arranged at intervals along each of said opposite side edges of said wider portion; and a plurality of projections circumferentially disposed on each of said peripheral faces of said pair of end caps at angular intervals about the axis of said core, each of said projections being received in corresponding one of said perforations, said projections extending to said second annular portion of the corresponding one of said cover rings so as to prevent each of said opposite side edges of said wider portion from coming out of said projections.

20. The cartridge of claim 19 wherein said pair of end caps are of a diameter greater than said certain diameter of said web so that said wider portion is essentially radially spaced from the outer surface of said web.

21. The cartridge of claim 19 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

22. The cartridge of claim 21 wherein said pair of end caps are of a diameter greater than said certain diameter of said web; and said wider portion is essentially radially spaced from the outer surface of said initial portion.

23. The cartridge of claim 16 wherein said fixing means comprises a pair of fastener rings, each being fitted around corresponding one of said pair of end caps via the corresponding one of said opposite side edges of said wider portion so as to fasten the corresponding one of said opposite side edges between the corresponding one of said fastener rings and the corresponding one of said peripheral faces; and said two tear lines are located on that portion of said wider portion between said pair of fastener rings.

24. The cartridge of claim 23 wherein said fixing means further comprises means for pressing said opposite side edges of said wider portion respectively against said peripheral faces of said pair of end caps so that each of said opposite side edges are firmly fastened between the corresponding one of said pair of fastener rings and the corresponding one of said peripheral faces.

25. The cartridge of claim 24 wherein said pressing means comprises an O-ring interposed between each of said pair of fastener rings and the corresponding one of said peripheral faces.

26. The cartridge of claim 25 wherein each of said peripheral faces has an annular recess formed therein and extending circumferentially along the corresponding one of said peripheral faces so that the corresponding one of said opposite side edges pressed by said O-ring received in said annular recess and is thereby firmly engaged with the corresponding one of said peripheral faces.

27. The cartridge of claim 26 wherein said pair of end caps are of a diameter greater than said certain diameter of said web so that said wider portion is essentially radially spaced from the outer surface of said web.

28. The cartridge of claim 26 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

29. The cartridge of claim 28 wherein said pair of end caps are of a diameter greater than said certain diameter of said web; and
said wider portion is essentially radially spaced from the outer surface of said initial portion.

30. The cartridge of claim 24 wherein said pressing means comprises a portion of each of said pair of fastener rings, which has an inner diameter less than the outer diameter of said tubular protection means.

31. The cartridge of claim 30 wherein each of said pair of fastener rings has a cylindrical inner face facing the corresponding one of said opposite side edges, and
said pressing means comprises an annular ridge disposed circumferentially on said cylindrical inner face of each of said pair of fastener rings.

32. The cartridge of claim 31 wherein said annular ridge is formed of an elastic material and is integral with the corresponding one of said pair of fastener rings.

33. The cartridge of claim 32 wherein each of said peripheral faces has an annular recess formed therein and extending circumferentially along the corresponding one of said peripheral faces so that the corresponding one of said opposite side edges pressed by said annular ridge is received in said annular recess and is thereby firmly engaged with the corresponding one of said peripheral faces.

34. The cartridge of claim 33 wherein said pair of end caps are of a diameter greater than said certain diameter of said web so that said wider portion is essentially radially spaced from the outer surface of said web.

35. The cartridge of claim 33 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

36. The cartridge of claim 35 wherein said pair of end caps are of a diameter greater than said certain diameter of said web; and
said wider portion is essentially radially spaced from the outer surface of said initial portion.

37. The cartridge of claim 16 wherein said fixing means comprises a bonding connection fixedly attaching said opposite side edges of said wider portion respectively to said peripheral faces of said pair of end caps.

38. The cartridge of claim 37 wherein said pair of end caps are of a diameter greater than said certain diameter of said web so that said wider portion is essentially radially spaced from the outer surface of said web.

39. The cartridge of claim 37 wherein said leader sheet further includes an initial portion connecting between said wider portion and the leading end of said photosensitive material, said initial portion having a width generally equal to said axial distance between said pair of end caps, said initial portion being wound onto said web more than once, whereby said initial portion is interposed between said tubular protection means and said web.

40. The cartridge of claim 39 wherein said pair of end caps are of a diameter greater than said certain diameter of said web; and
said wider portion is essentially radially spaced from the outer surface of said initial portion.

41. The cartridge of claim 16 wherein said fixing means comprises:
said wider portion having a plurality of perforations formed therein, said perforations being arranged at intervals along each of said opposite edges of said wider portion; and
a plurality of projections circumferentially disposed on each of said peripheral faces of said pair of end caps at angular intervals about the axis of said core, each of said projections comprising a stem having stopper means at an end thereof, said stem of each projection being received in corresponding one of said perforations, said stopper means engaging with said wider portion so that each of said projection is prevented from coming out of the corresponding one of said perforations.

42. The cartridge of claim 41 wherein said pair of end caps are of a diameter greater than said certain diameter of said web so that said wider portion is essentially radially spaced from the outer surface of said web.

43. The cartridge of claim 41 wherein said leader sheet further includes an initial portion connecting between said wider portion and the leading end of said photosensitive material, said initial portion having a width generally equal to said axial distance between said pair of end caps, said initial portion being wound onto said web more than once and whereby being interposed between said tubular protection means and said web.

44. The cartridge of claim 43 wherein said pair of end caps are of a diameter greater than said certain diameter of said web; and
said wider portion is essentially radially spaced from the outer surface of said initial portion.

45. A spooled photosensitive web cassette which comprises a web cartridge, a take-up spool, and a cassette frame which holds thereon said web cartridge together with said take-up spool, said web cartridge comprising:
an opaque, generally cylindrical core connected to said cassette frame for rotational movement about the axis thereof;
a pair of opaque end caps, each having an axis and a transverse outer size larger than the diameter of said core, said pair of end caps being disposed coaxially on said core at an axial distance between each other;
a length of photosensitive material wound onto that portion of said core between said pair of end caps to form a cylindrical web of a certain diameter not greater than said transverse outer size;
a leader sheet secured to a leading end of said photosensitive material, said leader sheet including an opaque wider portion circumferentially disposed entirely around said web to form a tubular protection means for said photosensitive material, said wider portion having a width greater than said axial distance between said pair of end caps and having opposite side edges extending circumferentially about the axis of said core, said tubular protection means having a substantially linear cross section taken along the axis of said core entirely along the width of said wider portion; and means for detachably connecting said opposite side edges of said wider portion respectively to said pair of end caps so as to mechanically retain said tubular protection means on said pair of end caps as well as to provide a light-tight seal between said tubular protection means and said pair of end caps, said take-up spool being connected to said cassette frame for rotational movement about the axis thereof, said take-up spool having a cylindrical portion for both said leader sheet and said photosensitive material being wound thereonto, said cylindrical portion of said take-up spool being of an axial length not less than said axial distance between said pair of end caps of said web cartridge.

* * * * *